United States Patent
Hanna

(10) Patent No.: US 11,940,926 B2
(45) Date of Patent: Mar. 26, 2024

(54) CREATING HIGH DENSITY LOGICAL TO PHYSICAL MAPPING

(71) Applicant: Micron Technology, Inc., Boise, ID (US)

(72) Inventor: Stephen Hanna, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/663,255

(22) Filed: May 13, 2022

(65) Prior Publication Data

US 2023/0367718 A1 Nov. 16, 2023

(51) Int. Cl.
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/7201* (2013.01)

(58) Field of Classification Search
CPC ............. G06F 12/1009; G06F 12/0246; G06F 2212/7201
See application file for complete search history.

(56) References Cited

U.S. PATENT DOCUMENTS

| | | | | |
|---|---|---|---|---|
| 2011/0055457 | A1* | 3/2011 | Yeh | G06F 12/0246 711/E12.001 |
| 2011/0099323 | A1* | 4/2011 | Syu | G06F 12/0246 711/E12.001 |
| 2015/0347040 | A1* | 12/2015 | Mathur | G06F 3/0688 711/103 |
| 2016/0048448 | A1* | 2/2016 | Kwon | G06F 12/0246 711/103 |
| 2016/0342509 | A1* | 11/2016 | Kotte | G06F 12/0246 |
| 2019/0034347 | A1* | 1/2019 | Haswell | G06F 12/0246 |
| 2019/0220416 | A1* | 7/2019 | Jung | G06F 12/1009 |
| 2020/0065241 | A1* | 2/2020 | Cho | G11C 16/08 |
| 2020/0364148 | A1* | 11/2020 | Lv | G06F 11/3034 |
| 2021/0349829 | A1* | 11/2021 | Cariello | G06F 12/0246 |
| 2022/0317879 | A1* | 10/2022 | Lin | G06F 3/0631 |

* cited by examiner

*Primary Examiner* — Tasnima Matin
(74) *Attorney, Agent, or Firm* — Holland & Hart LLP

(57) ABSTRACT

Methods, systems, and devices for creating high density logical to physical mapping are described. A memory system may implement storage of mapping information to store the logical addresses and the corresponding physical addresses. A memory system may receive a command associated with data and a corresponding set of logical addresses, and in some cases the memory device may determine that the logical addresses are sequential. The memory device may generate and store a set of compressed entries in a macro level of the mapping information. When the memory system receives a command associated with an exception to the sequential logical addresses, the memory system may update an entry of the macro level to include a pointer to a set of entries in another level of the mapping information.

25 Claims, 7 Drawing Sheets

US 11,940,926 B2

CREATING HIGH DENSITY LOGICAL TO PHYSICAL MAPPING

FIELD OF TECHNOLOGY

The following relates to one or more systems for memory, including creating high density logical to physical mapping.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
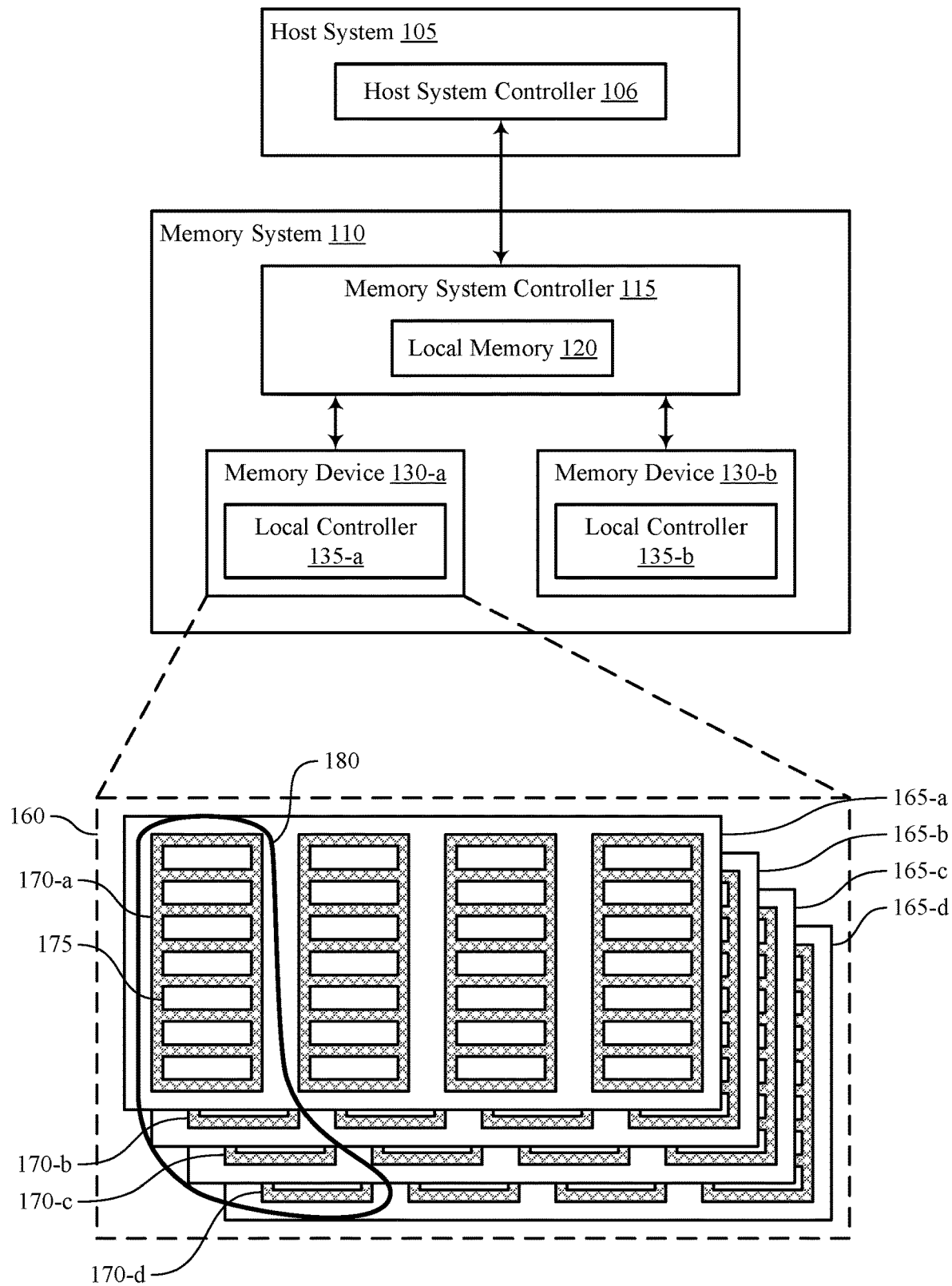
FIG. 1 illustrates an example of a system that supports creating high density logical to physical mapping in accordance with examples as disclosed herein.

Memory devices of a memory system may store data at a corresponding physical address, where a physical address may identify a physical location of a corresponding memory cell within a memory device. The physical location of data within the memory device may change over time due to the memory device writing additional data, maintenance operations performed by the memory device (e.g., garbage collection operations), or for any number of other reasons. A host system coupled with the memory system may reference data (e.g., if issuing read, write, or other commands associated with the data) using logical addresses (e.g., logical block addresses (LBAs), virtual addresses, system addresses, or other logical addresses), and the memory system may generate and maintain mapping information (e.g., a logical to physical (L2P) table) at, for example, a flash translation layer (FTL) of the memory device. The mapping information may include a mapping between the logical addresses associated with the data and the physical addresses of the memory cells at which the data is stored, which may support the memory device changing the physical addresses over time. In some examples, it may be beneficial to increase a range of logical addresses included in the mapping information to reduce latency associated with access operations.

According to the techniques described herein, the mapping information may include multiple levels for storing entries. For example, a macro level (e.g., a macro map) may be used to store coarser entries if logical addresses are sequential. For example, a memory system may receive a command associated with data having a corresponding set of logical addresses (e.g., a write command from a host device). In some cases, the memory system may determine whether a subset of the logical addresses is sequential, and the memory system may coalesce the range of sequential data and generate one coarse entry and store the entry in the macro level, rather than storing multiple single entries in the L2P level if the subset of the logical addresses is sequential. Storing sequential data in the macro level using the course entry may increase the storage capabilities of the memory device without degrading write performance or introducing drive wear out, among other disadvantages. In some cases, the memory system may modify a mapping to include an exception to previously sequential data stored in the macro level. In this case, the memory system may update the mapping and store a set of entries in another level (e.g., the L2P level), and the memory system may update the entry in the macro level to include an exception pointer indicating the set of entries stored in the L2P level. The L2P table may have multiple levels. The levels may include a root level (e.g., Level-0), a global level (e.g., Level-1), a macro level (e.g., Level-2), and an L2P level (e.g., Level-3). In accordance with the present disclosure, the macro level may include mapping information for sequential data. The macro level may include pointers to the L2P level (e.g., for an exception in a series of sequential data), and the global level may include pointers to where data is mapped in the macro level or in the L2P level.

Figure 2:
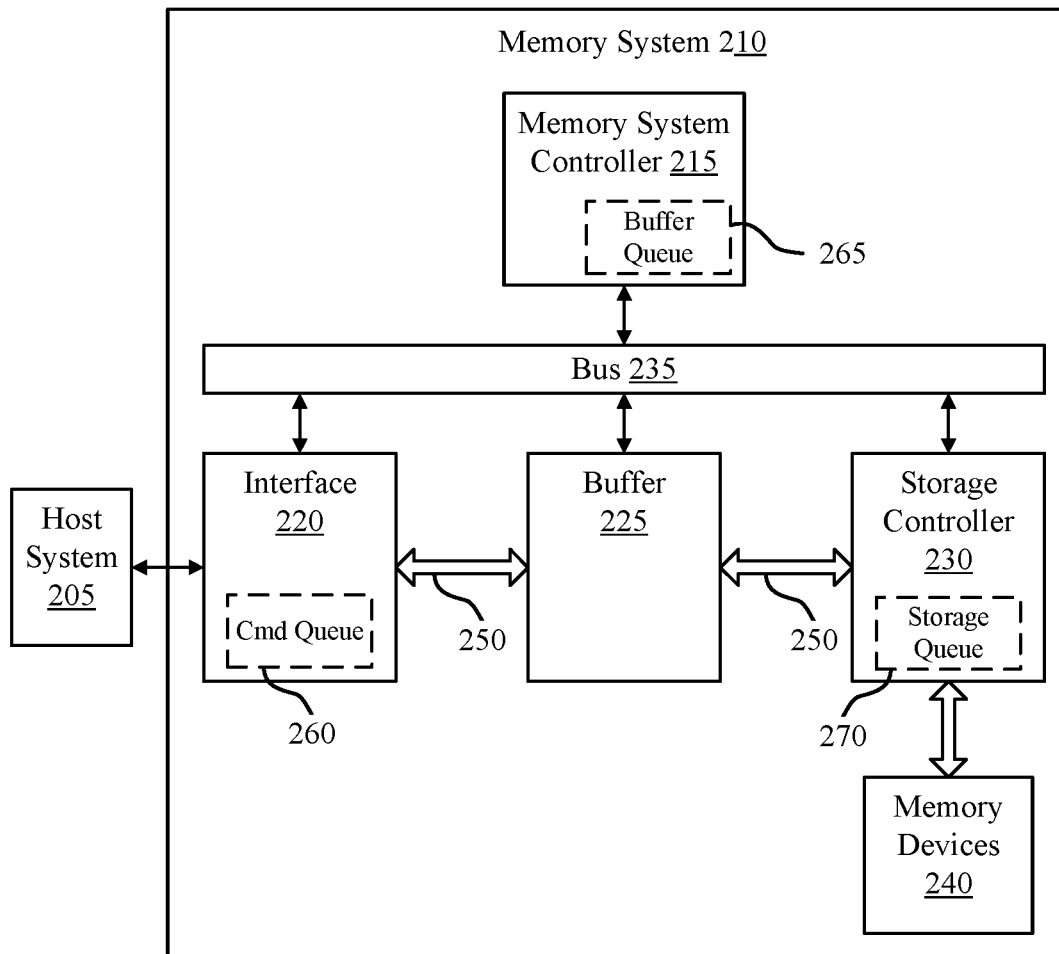
FIG. 2 illustrates an example of a system that supports creating high density logical to physical mapping in accordance with examples as disclosed herein.

Features of the disclosure are initially described in the context of systems, devices, and circuits with reference to FIGS. 1 through 2. Features of the disclosure are described in the context of system diagrams and flow charts with reference to FIGS. 3-6. These and other features of the disclosure are further illustrated by and described in the context of an apparatus diagram and flowchart that relate to creating high density logical to physical mapping with reference to FIGS. 7-8.

FIG. 1 illustrates an example of a system 100 that supports creating high density logical to physical mapping in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update an L2P mapping table in an FTL to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

The system 100 may include any quantity of non-transitory computer readable media that support creating high density logical to physical mapping. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

Memory devices 130 of a memory system 110 may store data at a corresponding physical address, where a physical address may identify a physical location of a corresponding memory cell within a memory device 130. The physical location of data within the memory device 130 may change over time due to the memory device accommodating the writing of additional data, maintenance operations performed by the memory device 130 (e.g., garbage collection operations), or for any number of other reasons. A host system 105 coupled with the memory system 110 may reference data (e.g., if issuing read, write, or other commands associated with the data) using logical addresses (e.g., LBAs, virtual addresses, system addresses, or other logical addresses), and the memory system 110 may generate and maintain mapping information (e.g., an L2P table) at an FTL, including a mapping between the logical addresses associated with the data and the physical addresses of the memory cells at which the data is stored, which may support the memory device changing the physical addresses over time. In some examples, it may be beneficial to increase a range of logical addresses included in the mapping information to reduce latency associated with access operations.

According to the techniques described herein, the mapping information may include multiple levels for storing entries. For example, a macro level (e.g., a macro map) may be used to store coarser entries if logical addresses are sequential. For example, a memory system 110 may receive a command associated with data having a corresponding set of logical addresses (e.g., a write command from a host system 105). In some cases, the memory system 110 may determine whether a subset of the logical addresses is sequential, and the memory system 110 may coalesce the range of sequential data and generate one coarse entry (e.g., one 8 megabyte (MB) entry) and store the entry in the macro level, rather than storing multiple single entries in the L2P level (e.g., eight 1 MB entries), if the subset of the logical addresses is sequential. Storing sequential data in the macro level may increase the storage capabilities of the memory system 110 without degrading write performance or introducing drive wear out. In some cases, the memory system 110 may modify a mapping to include an exception to previously sequential data stored in the macro level. In this case, the memory system 110 may update the mapping and store a set of entries in another level (e.g., the L2P level), and the memory system 110 may update the entry in the macro level to include an exception pointer indicating the set of entries stored in the L2P level. The mapping information may have multiple levels, including a global level, the macro level, and the L2P level. In accordance with the present disclosure, the macro level may include mapping information for sequential data. The macro level may include pointers to the L2P level (e.g., for an exception in a series of sequential data), and the global level may include pointers to where data is mapped in the macro level or in the L2P level.

FIG. 2 illustrates an example of a system 200 that supports creating high density logical to physical mapping in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received based on or in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMNIC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

Memory devices 240 of a memory system 210 may store data at a corresponding physical address, where a physical address may identify a physical location of a corresponding memory cell within a memory device 240. The physical location of data within the memory device 240 may change over time due to the memory device accommodating the writing of additional data, maintenance operations performed by the memory device 240 (e.g., garbage collection operations), or for any number of other reasons. A host system 205 coupled with the memory system 110 may reference data (e.g., if issuing read, write, or other commands associated with the data) using logical addresses (e.g., LBAs, virtual addresses, system addresses, or other logical addresses), and the memory system 210 may generate and maintain mapping information (e.g., an L2P table) at an FTL (e.g., at a memory system controller 215 or a storage controller 230), including a mapping between the logical addresses associated with the data and the physical addresses of the memory cells at which the data is stored, which may support the memory device changing the physical addresses over time. In some examples, it may be beneficial to increase a range of logical addresses included in the mapping information to reduce latency associated with access operations.

According to the techniques described herein, the mapping information may include multiple levels for storing entries. For example, a macro level (e.g., a macro map) may be used to store coarser entries if logical addresses are sequential. For example, a memory system 210 may receive a command associated with data having a corresponding set of logical addresses (e.g., a write command from a host system 205). In some cases, the memory system 210 may determine whether a subset of the logical addresses is sequential, and the memory system 210 may coalesce the range of sequential data and generate one coarse entry (e.g., one 8 MB entry) and store the entry in the macro level, rather than storing multiple single entries in the L2P level (e.g., eight 1 MB entries), if the subset of the logical addresses is sequential. Storing sequential data in the macro level may increase the storage capabilities of the memory system 210 without degrading write performance or introducing drive wear out. In some cases, the memory system 210 may modify a mapping to include an exception to previously sequential data stored in the macro level. In this case, the memory system may update the mapping and store a set of entries in another level (e.g., the L2P level), and the memory system 210 may update the entry in the macro level to include an exception pointer indicating the set of entries stored in the L2P level. The mapping information may have multiple levels. The levels may include a root level (e.g., Level-0), a global level (e.g., Level-1), a macro level (e.g., Level-2), and an L2P level (e.g., Level-3). In accordance with the present disclosure, the macro level may include mapping information for sequential data. The macro level may include pointers to the L2P level (e.g., for an exception in a series of sequential data), and the global level may include pointers to where data is mapped in the macro level or in the L2P level.

Figure 3:
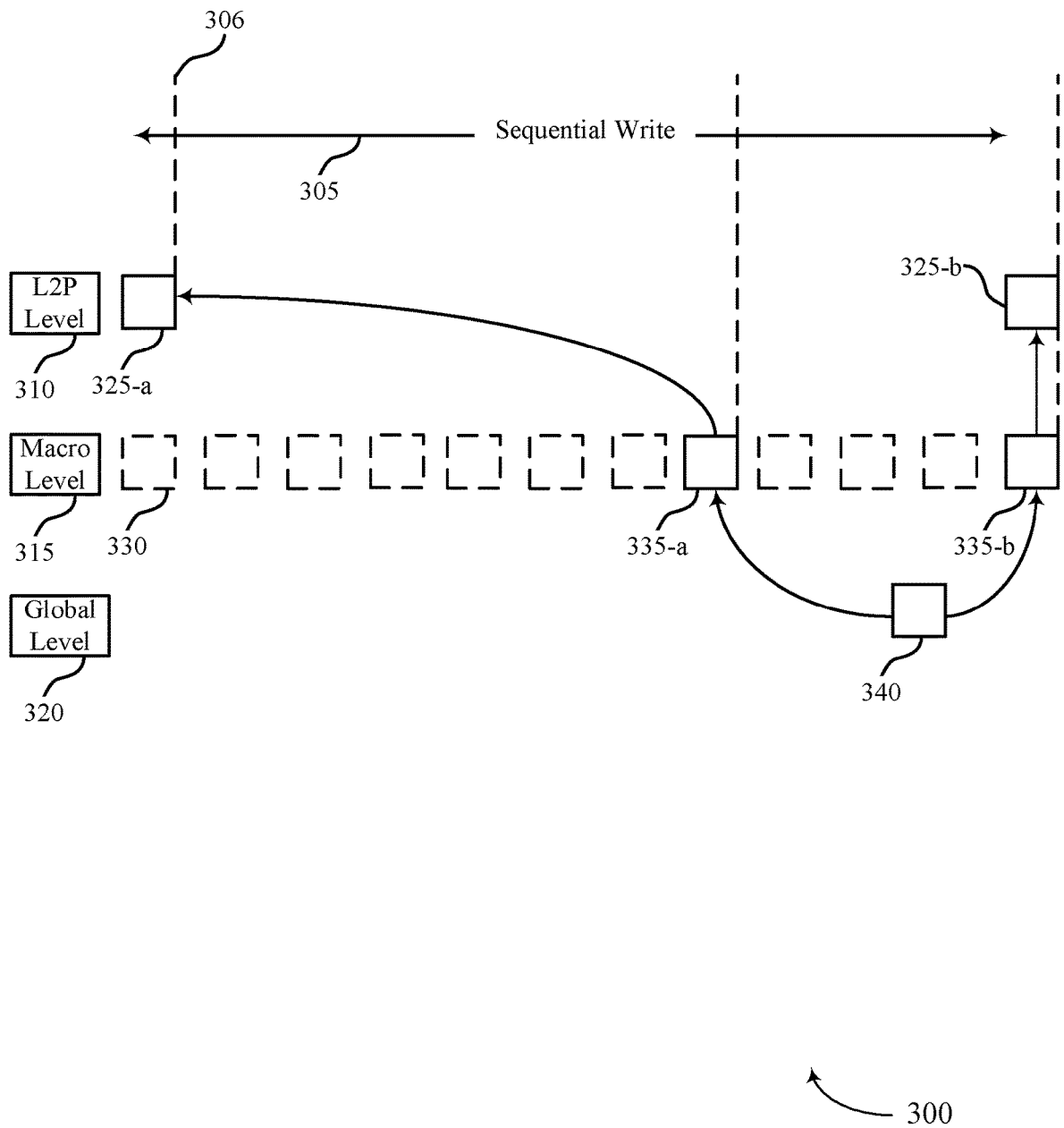
FIG. 3 illustrates an example of a flash translation layer that supports creating high density logical to physical mapping in accordance with examples as disclosed herein.

FIG. 3 illustrates an example of an FTL 300 that supports creating high density logical to physical mapping in accordance with examples as disclosed herein. The FTL 300 may implement aspects of a system 100 and a system 200, as described with reference to FIGS. 1 and 2. For example, the FTL 300 may be implemented by a controller, (e.g., a memory system controller 115, a local controller 135, or a memory system controller 215), or a memory device, (e.g., a memory device 130 or a memory device 240), or both, as described with reference to FIG. 1. The FTL 300 may be implemented to increase storage capabilities without degrading write performance or introducing drive wear out, among other benefits.

The FTL 300 may be implemented to manage memory operations at a memory system, such as L2P address translation, garbage collection, etc. For example, the FTL 300 may include an example of mapping information (e.g., an L2P table) which a memory system may implement to maintain a mapping between the logical addresses (e.g., LBAs, virtual addresses, system addresses, or other logical addresses) associated with data and the physical addresses of the memory cells at which the data is stored, which may support the memory system changing the physical addresses over time. The mapping information may include multiple levels, such as an L2P level 310, a macro level 315, a global level 320, and a root level.

At the macro level 315, the addressing range (e.g., the range of logical addresses that can be addressed from a controller without fetching the mapping between the logical addresses and the physical addresses to determine where data is stored) of the memory system may increase if the FTL 300 compresses coalesced logical addresses at the macro level 315. For example, if a sequential write 305 (e.g., a set of data with sequential logical addresses) is received at the memory system, a set of entries 330 may be generated, where each entry 330 may indicate a mapping between a logical address and a physical address.

At the start of the sequential write 305, if the data reaches an alignment point 306, the FTL 300 may coalesce multiple entries 330 into a single macro entry 335. In an example, the sequential write 305 may be a command to write 11 MB of data at the memory system. Eight generated entries 330 may be coalesced into a macro entry 335-a (which may be a coarser entry than the entries 330) and stored in the macro level 315, rather than eight individual L2P entries 325 being stored in the L2P level 310. In the same example, four additional entries 330 corresponding to the sequential data may be coalesced into a macro entry 335-b in the macro level 315. The macro entry 335-a may point to an L2P entry 325-a stored in the L2P level 310 to indicate the beginning of the sequential data, and the macro entry 335-b may point to an L2P entry 325-b in the L2P level 310 to indicate the end of the sequential data. In some cases, the global level 320 of the FTL 300 may point to or indicate 12 individual maps. However, the pointer may be replicated so the global level 320 holds eight global entries 340 that point to the macro entry 335-a, and four global entries 340 that point to the macro entry 335-b in the macro level 315.

In some cases, the macro entry 335-a may contain 8 times the amount of data in an L2P entry 325 in the L2P level 310 (e.g., 1 entry representing 8 logical addresses, rather than 8 entries each representing one logical address). Similarly, the macro entry 335-b may contain 4 times the amount of data in an L2P entry 325 in the L2P level 310 (e.g., 1 entry representing 4 logical addresses, rather than 4 entries each representing one logical address), within one entry in the macro level 315. Thus, the addition of the macro level 315 may increase the amount of mapped data without increasing the storage necessary to store the mapping information. The ability to store more information in fewer entries (e.g., in the macro entries 335) of the mapping information may increase storage capability of the memory system without degrading write performance or introducing drive wear out.

In some cases, each macro entry 335 in the macro level 315 may include or be associated with metadata, or a codeword offset, which may include a bit field. A set of bits in the bit field may be used to indicate a compression ratio (e.g., density) of the macro entry 335. For example, a compression ratio of 8, indicated by the bit field, may indicate that the macro entry 335-a represents 8 logical addresses. Similarly, the macro entry 335-b may have a compression ratio of 4.

Table 1 includes examples of a physical table size, a cache size, and a storage type of each level of the mapping information in the FTL 300. In some cases, to minimize the RAM footprint to support a high-capacity device, the mapping information may be managed as a 3 or 4 level index. In some cases, each level of the index may reduce the amount of memory by around three orders of magnitude. In some cases, the root level may be fully cached in the RAM, while the global level 320, the macro level 315, and the L2P level 310 may be partially cached.

TABLE 1

| L2P Index | Physical Table Size | Cache Size | Type |
|---|---|---|---|
| Root Level | 32 KB | 32 KB | Static |
| Global Level 320 | 8 MB | 8-32 KB | Static |
| Macro Level 315 | 256 MB | 256-1024 KB | Dynamic |
| L2P Level 310 | 2048 MB | 256-1024 KB | Dynamic |

Figure 4:
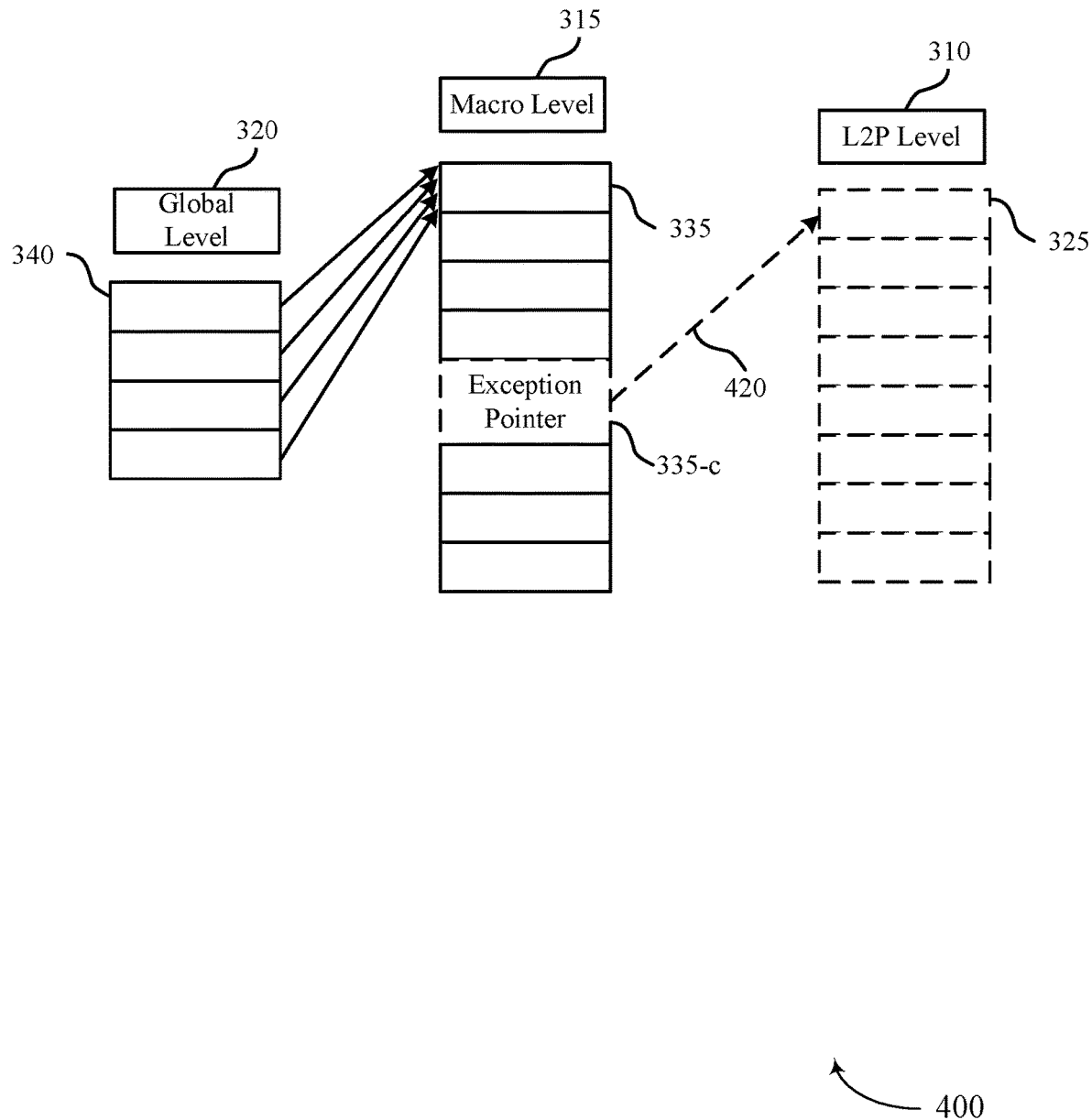
FIG. 4 illustrates an example of a mapping table that supports creating high density logical to physical mapping in accordance with examples as disclosed herein.

FIG. 4 illustrates an example of a mapping table 400 that supports creating high density logical to physical mapping in accordance with examples as disclosed herein. In some cases, the mapping table 400 may be implemented in an FTL 300 described with reference to FIG. 3.

In some cases, a host system may modify a logical address and write an exception to previously mapped sequential data that a memory system stored in a macro level 315, as described with reference to FIG. 3. In some cases, the new logical addresses may no longer be sequential and may be addressed uniquely by the memory system. In this case, rather than discarding the mapping stored in macro entries of the macro level 315, the memory system may store an exception pointer 420 in the macro level 315 which points to a new mapping in the L2P level 310.

The global level 320 may include global entries 340, where a set of global entries may each point to a same macro entry 335 in the macro level 315, as described with reference to FIG. 3. In some cases, the memory system may receive a command (e.g., a write command from the host system) associated with a modification to a subset of logical addresses (e.g., previously sequential logical addresses) stored in a macro entry 335-c in the macro level 315. In some cases, the memory system may determine that the new subset of addresses is not sequential, and the memory system may update the macro entry 335-c to include an exception pointer 420. The exception pointer 420 may indicate a set of L2P entries 425 stored in the L2P level 310 that contain the new subset of addresses. The L2P entries 425 stored in the L2P level 310 may be initialized with the sequential addresses from the macro entry 335-c in the macro level 315 of the mapping information.

Although the data previously stored in the macro entry 335-c of the macro level 315 may move to the L2P level 310, the memory system may maintain the other macro entries 335 in the macro level 315 that are still valid. The exception pointer 420 may allow the memory system to store the non-sequential data without discarding the mapping of the sequential data stored in the macro level 315.

In some cases, after multiple macro entries 335 in the macro level 315 are updated with exception pointers 420, the memory system may determine that the number of exception pointers 420 satisfies (e.g., exceeds) a threshold. In this case, the memory system may discard the updated macro entries 335 that include the exception pointers 420. The memory system may then transfer the exception pointers 420 to the global level 320. For example, the memory system may update one or more global entries 340 in the global level 320 to include pointers to the data stored in the L2P level 310. A quantity of updated global entries 340 in the global level 320 may include or correspond to a quantity of exception pointers 420 in the macro level 315. In some cases, the mapping in the macro level 315 may be discarded based on or in response to the quantity of exception pointers 420 satisfying (e.g., exceeding) the threshold.

The exception pointers 420 may affect the compression ratio of the macro level 315, but the storage capability of the mapping table 400 may be increased compared storing the mapping in L2P entries 325 in the L2P level 310 with no compression or coalescing of sequential entries. Thus, the memory system may increase storage capabilities while maintaining logical address flexibility and relatively low latencies with the addition of exception pointers 420 in updated macro entries 335.

Figure 5:
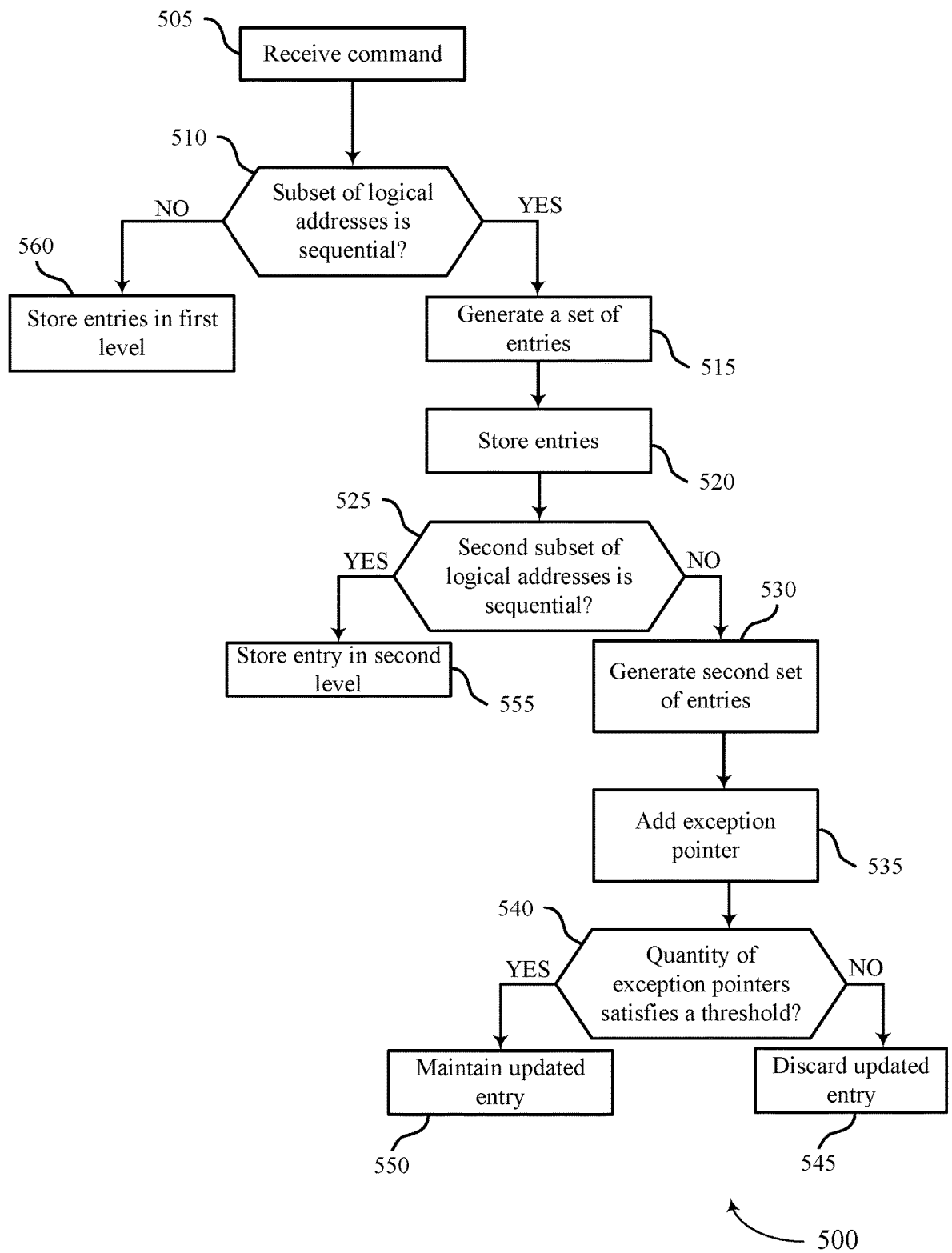
FIG. 5 illustrates an example of a process flow that supports creating high density logical to physical mapping in accordance with examples as disclosed herein.

FIG. 5 illustrates an example of a process flow 500 that supports creating high density logical to physical mapping in accordance with examples as disclosed herein. Process flow 500 may be performed by components of a memory system, such as memory system 110 described with reference to FIG. 1. For example, process flow 500 may be performed by a controller of a memory system or a memory device (or both) such as a memory system controller 115 or a local controller 135 as described with reference to FIG. 1. Process flow 500 may depict a process for storing mapping information such as a mapping between logical addresses to physical addresses of sequential data to increase storage capability of a memory system, among other benefits. Aspects of the process flow 500 may be implemented by a controller, among other components. Additionally or alternatively, aspects of the process flow 500 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 500.

In the following description of the process flow 500, the operations may be performed in different orders or at different times. Some operations may also be omitted from the process flow 500, and other operations may be added to the process flow 500.

At 505, a command associated with data having corresponding set of logical address may be received. For example, the controller may receive a command associated with the data from a host system. Examples of the command may include a write command, an unmap command, a wear leveling command, a garbage collect command, or some other command that involves a mapping maintained by the controller.

At 510, a subset of logical addresses of the set of logical addresses may be evaluated as to whether it is sequential, as described with reference to FIG. 3. For example, in response to receiving the command, the controller may determine whether one or more logical addresses of the subset are sequential with other logical addresses of the subset. If, at 510, the controller determines that the subset of logical addresses is not sequential, the controller may perform 560 as follows.

At 560, a set of entries may be stored in the first level (e.g., the L2P level). For example, the controller may store a set of entries in the first level. Each entry of the set of entries may indicate a mapping between a logical address (e.g., of the set of logical addresses) and a physical address (e.g., of a corresponding set of physical addresses).

If, at 510, the controller determines that the logical addresses of the subset are sequential, the controller may perform 515 through 525, as follows.

At 515, a set of entries may be generated, where each entry may indicate a mapping between a logical address (e.g., of the set of logical addresses) and a physical address (e.g., of a corresponding set of physical addresses). For example, the controller may generate the set of entries. The set of entries may be associated with a first level of a mapping information (e.g., an L2P level, which may include an L2P map). In some cases, the mapping information may include a logical to physical mapping (e.g., an L2P table).

At 520, an entry may be stored in a second level of the mapping information (e.g., a macro level, which may include a macro map). For example, the controller may store an entry in a second level of the mapping information. The entry may indicate the mapping between the set of logical addresses and the set of physical addresses based on or in response to the subset of logical addresses being sequential. For example, the entry may be an example of a macro entry 335 as described with reference to FIG. 3. In some cases, the entry stored in the second level may also include a bit field. The bit field may indicate a compression parameter associated with the set of entries in first level (e.g., the L2P level) of the mapping information and the second level (e.g., the macro level) of the mapping information (e.g., a ratio of compression of the macro level entry to the set of entries in the L2P level of the mapping information).

In some examples, a second command associated with second data with a corresponding second set of logical addresses may be received. For example, the controller may receive a second command associated with the second data from the host system. The set of logical addresses may be evaluated as to whether it includes the second set of logical addresses. If the set of sequential logical addresses stored in the macro level includes the second set of logical addresses, an access operation associated with the second command may be performed in accordance with the mapping indicated by the entry in the second level of the mapping information.

In some cases, at 520, a second entry (e.g., a global entry) may be stored in a third level of the mapping information (e.g., a global level, which may include a global map) based on or in response to storing the entry in the second level. For example, the controller may store a second entry in a third level of the mapping information. The second entry may indicate a location of the stored entry. In some cases, at 520, a third entry (e.g., a root entry) may be stored in a fourth level of the mapping information (e.g., a root level, which may include a root map) based on or in response to storing the second entry. For example, the controller may store a third entry in a fourth level of the mapping information.

At 525, a second subset of logical addresses of the set of logical addresses may be evaluated as to whether it is sequential. For example, the controller may determine whether one or more logical addresses of the second subset are sequential with other logical addresses of the second subset. If, at 525, the controller determines that the second subset of logical addresses is sequential, the controller may perform 555 as follows.

At 555, a second entry may be stored in the second level (e.g., the macro level) of the mapping information. For example, the controller may store a second entry in the second level based on determining that the second subset of logical addresses is sequential. The second entry may indicate the mapping between the set of logical addresses and the set of physical addresses based on or in response to the second subset of logical addresses being sequential.

If, at 525, the controller determines that the second subset of logical addresses is not sequential, the controller may perform 530 through 540, as follows.

At 530, a second set of entries (e.g., entries 425 as described with reference to FIG. 4) associated with the first level of mapping information (e.g., the L2P level) may be generated. For example, the controller may generate the second set of entries. In some cases, each entry of the second set of entries may indicate a second mapping between a logical address of the second subset of logical addresses and a physical address of a second set of physical addresses. In some examples, the second subset of non-sequential entries may be stored in the L2P level.

At 535, the entry in the second level of the mapping information may be updated based on or in response to generating the second set of entries. For example, the controller may update the entry in the second level based on or in response to generating the second set of entries. In some examples, the updated entry in the second level may include an exception pointer that indicates the second mapping between the second subset of non-sequential logical addresses and the second set of physical addresses. The second mapping may be stored in the L2P level.

At 540, a quantity of exception pointers in the updated entry may be evaluated as to whether it satisfies a threshold. For example, the controller may determine whether a quantity of exception pointers in the updated entry satisfies (e.g., exceeds) a threshold. If, at 540, the controller determines that the quantity of exception pointers in the updated entry satisfies the threshold, the controller may perform 545 as follows.

At 545, the updated entry in the second level of the mapping information may be discarded. For example, the controller may discard the updated entry in the second level of the mapping information. In some cases, an entry that includes the quantity of exception pointers may be stored in the third level of the mapping information (e.g., the global level). In some cases, the mapping information in the macro level may be discarded.

If, at 540, the controller determines that the quantity of exception pointers in the updated entry does not the threshold, the controller may perform 550 as follows.

At 550, the updated entry stored in the second level may be maintained. For example, the controller may maintain the updated entry stored in the second level.

Figure 6:
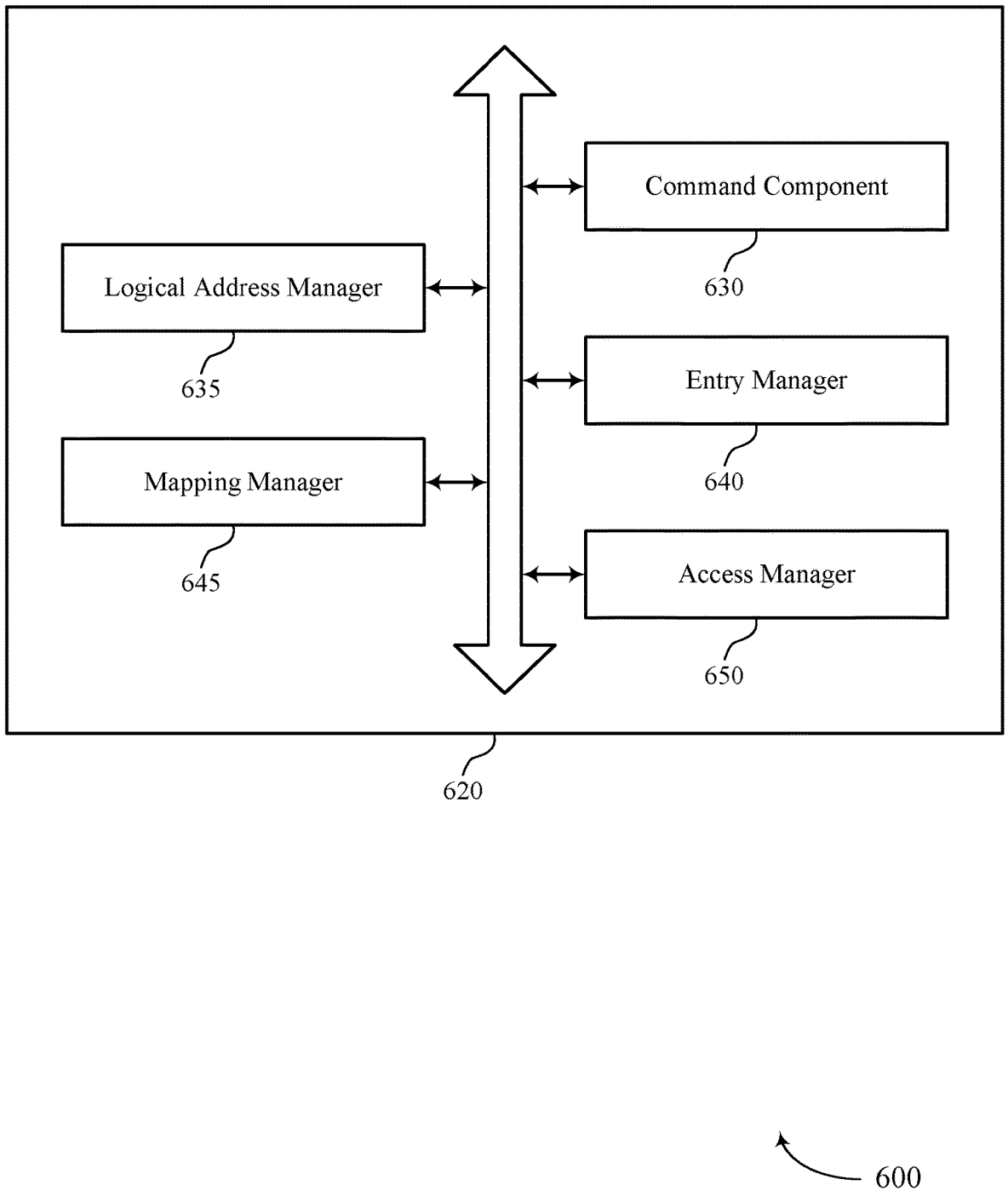
FIG. 6 shows a block diagram of a memory system that supports creating high density logical to physical mapping in accordance with examples as disclosed herein.

FIG. 6 shows a block diagram 600 of a memory system 620 that supports creating high density logical to physical mapping in accordance with examples as disclosed herein. The memory system 620 may be an example of aspects of a memory system as described with reference to FIGS. 1 through 5. The memory system 620, or various components thereof, may be an example of means for performing various aspects of creating high density logical to physical mapping as described herein. For example, the memory system 620 may include a command component 630, a logical address manager 635, an entry manager 640, a mapping manager 645, an access manager 650, or any combination thereof. Each of these components may communicate, directly or indirectly, with one another (e.g., via one or more buses).

The command component 630 may be configured as or otherwise support a means for receiving, at a memory system, a command associated with data having a corresponding set of logical addresses. The logical address manager 635 may be configured as or otherwise support a means for determining whether a subset of logical addresses of the set of logical addresses is sequential. The entry manager 640 may be configured as or otherwise support a means for generating a set of entries based at least in part on the determining, each entry of the set of entries indicating a mapping between a logical address of the set of logical addresses and a physical address of a set of physical addresses, the set of entries associated with a first level of a mapping information. The mapping manager 645 may be configured as or otherwise support a means for storing an entry in a second level of the mapping information based at least in part on the generating, the entry indicating the mapping between the set of logical addresses and the set of physical addresses based at least in part on the subset of logical addresses being sequential.

In some examples, the command component 630 may be configured as or otherwise support a means for receiving a second command associated with second data having a corresponding second set of logical addresses. In some examples, the logical address manager 635 may be configured as or otherwise support a means for determining whether the set of logical addresses includes the second set of logical addresses. In some examples, the access manager 650 may be configured as or otherwise support a means for performing, based at least in part on the set of logical addresses including the second set of logical addresses, an access operation associated with the second command in accordance with the mapping indicated by the entry in the second level of the mapping information.

In some examples, the logical address manager 635 may be configured as or otherwise support a means for determining whether a second subset of logical addresses of the set of logical addresses is sequential. In some examples, the entry manager 640 may be configured as or otherwise support a means for generating a second set of entries associated with the first level of the mapping information based at least in part on the determining, each entry of the second set of entries indicating a second mapping between a logical address of the second subset of logical addresses and a physical address of a second set of physical addresses. In some examples, the mapping manager 645 may be configured as or otherwise support a means for updating the entry in the second level of the mapping information based at least in part on the generating, the updated entry including an exception pointer indicating the second mapping between the subset of logical addresses and the second set of physical addresses based at least in part on the second subset of logical addresses not being sequential.

In some examples, the mapping manager 645 may be configured as or otherwise support a means for determining whether a quantity of exception pointers in the updated entry satisfies a threshold. In some examples, the mapping manager 645 may be configured as or otherwise support a means for discarding the updated entry in the second level of the mapping information based at least in part on the quantity of exception pointers satisfying the threshold.

In some examples, the mapping manager 645 may be configured as or otherwise support a means for storing a second entry in a third level of the mapping information based at least in part on discarding the updated entry in the second level of the mapping information, the second entry including the quantity of exception pointers.

In some examples, the entry in the second level of the mapping information includes a bit field indicating a compression parameter that is associated with the set of entries in the first level of the mapping information and the entry in the second level of the mapping information.

In some examples, the mapping manager 645 may be configured as or otherwise support a means for storing a second entry in a third level of the mapping information based at least in part on storing the entry in the second level, the second entry indicating a location of the stored entry. In some examples, the mapping manager 645 may be configured as or otherwise support a means for storing a third entry in a fourth level of the mapping information based at least in part on storing the second entry.

In some examples, the first level of the mapping information includes a logical to physical map. In some examples, the second level of the mapping information includes a macro map. In some examples, the third level of the mapping information includes a global map. In some examples, the fourth level of the mapping information includes a root map.

In some examples, the mapping information includes a logical to physical mapping table.

Figure 7:
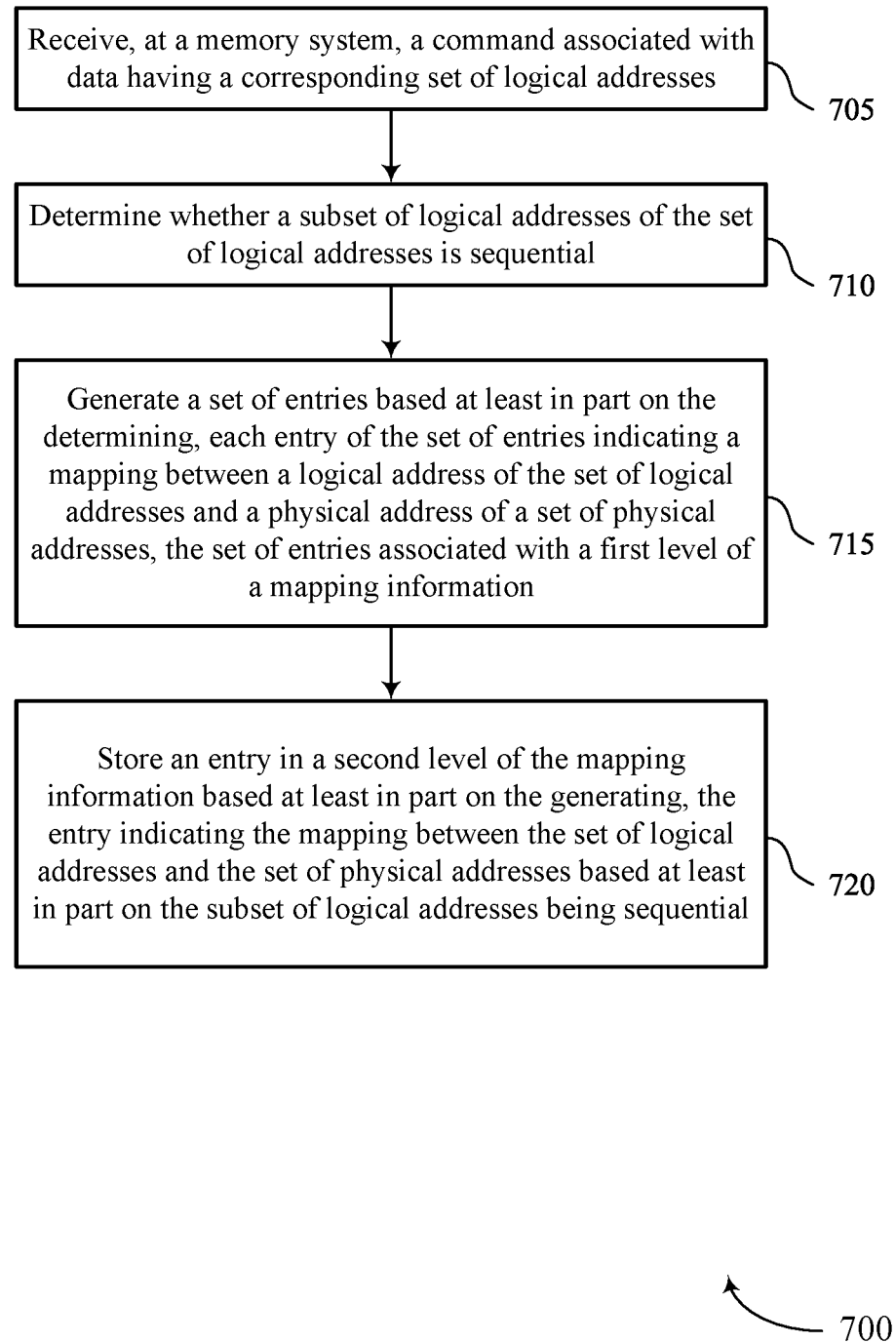
FIG. 7 shows a flowchart illustrating a method or methods that support creating high density logical to physical mapping in accordance with examples as disclosed herein.

FIG. 7 shows a flowchart illustrating a method 700 that supports creating high density logical to physical mapping in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include receiving, at a memory system, a command associated with data having a corresponding set of logical addresses. The operations of 705 may be performed in accordance with examples as disclosed herein. In some examples, aspects of the operations of 705 may be performed by a command component 630 as described with reference to FIG. 6.

At 710, the method may include determining whether a subset of logical addresses of the set of logical addresses is sequential. The operations of 710 may be performed in accordance with examples as disclosed herein. In some examples, aspects of the operations of 710 may be performed by a logical address manager 635 as described with reference to FIG. 6.

At 715, the method may include generating a set of entries based at least in part on the determining, each entry of the set of entries indicating a mapping between a logical address of the set of logical addresses and a physical address of a set of physical addresses, the set of entries associated with a first level of a mapping information. The operations of 715 may be performed in accordance with examples as disclosed herein. In some examples, aspects of the operations of 715 may be performed by an entry manager 640 as described with reference to FIG. 6.

At 720, the method may include storing an entry in a second level of the mapping information based at least in part on the generating, the entry indicating the mapping between the set of logical addresses and the set of physical addresses based at least in part on the subset of logical addresses being sequential. The operations of 720 may be performed in accordance with examples as disclosed herein. In some examples, aspects of the operations of 720 may be performed by a mapping manager 645 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, a command associated with data having a corresponding set of logical addresses; determining whether a subset of logical addresses of the set of logical addresses is sequential; generating a set of entries based at least in part on the determining, each entry of the set of entries indicating a mapping between a logical address of the set of logical addresses and a physical address of a set of physical addresses, the set of entries associated with a first level of a mapping information; and storing an entry in a second level of the mapping information based at least in part on the generating, the entry indicating the mapping between the set of logical addresses and the set of physical addresses based at least in part on the subset of logical addresses being sequential.

Aspect 2: The method, apparatus, or non-transitory computer-readable medium of aspect 1, further including operations, features, circuitry, logic, means, or instructions, or any combination thereof for receiving a second command associated with second data having a corresponding second set of logical addresses; determining whether the set of logical addresses includes the second set of logical addresses; and performing, based at least in part on the set of logical addresses including the second set of logical addresses, an access operation associated with the second command in accordance with the mapping indicated by the entry in the second level of the mapping information.

Aspect 3: The method, apparatus, or non-transitory computer-readable medium of any of aspects 1 through 2, further including operations, features, circuitry, logic, means, or instructions, or any combination thereof for determining whether a second subset of logical addresses of the set of logical addresses is sequential; generating a second set of entries associated with the first level of the mapping information based at least in part on the determining, each entry of the second set of entries indicating a second mapping between a logical address of the second subset of logical addresses and a physical address of a second set of physical addresses; and updating the entry in the second level of the mapping information based at least in part on the generating, the updated entry including an exception pointer indicating the second mapping between the subset of logical addresses and the second set of physical addresses based at least in part on the second subset of logical addresses not being sequential.

Aspect 4: The method, apparatus, or non-transitory computer-readable medium of aspect 3, further including operations, features, circuitry, logic, means, or instructions, or any combination thereof for determining whether a quantity of exception pointers in the updated entry satisfies a threshold and discarding the updated entry in the second level of the mapping information based at least in part on the quantity of exception pointers satisfying the threshold.

Aspect 5: The method, apparatus, or non-transitory computer-readable medium of aspect 4, further including operations, features, circuitry, logic, means, or instructions, or any combination thereof for storing a second entry in a third level of the mapping information based at least in part on discarding the updated entry in the second level of the mapping information, the second entry including the quantity of exception pointers.

Aspect 6: The method, apparatus, or non-transitory computer-readable medium of any of aspects 1 through 5 where the entry in the second level of the mapping information includes a bit field indicating a compression parameter that is associated with the set of entries in the first level of the mapping information and the entry in the second level of the mapping information.

Aspect 7: The method, apparatus, or non-transitory computer-readable medium of any of aspects 1 through 6, further including operations, features, circuitry, logic, means, or instructions, or any combination thereof for storing a second entry in a third level of the mapping information based at least in part on storing the entry in the second level, the second entry indicating a location of the stored entry and storing a third entry in a fourth level of the mapping information based at least in part on storing the second entry.

Aspect 8: The method, apparatus, or non-transitory computer-readable medium of aspect 7 where the first level of the mapping information includes a logical to physical map; the second level of the mapping information includes a macro map; the third level of the mapping information includes a global map; and the fourth level of the mapping information includes a root map.

Aspect 9: The method, apparatus, or non-transitory computer-readable medium of any of aspects 1 through 8 where the mapping information includes a logical to physical mapping table.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 10: An apparatus, including: a controller associated with a memory system, where the controller is configured to cause the apparatus to: receive a command associated with data having a corresponding set of logical addresses; determine whether a subset of logical addresses of the set of logical addresses is sequential; generate a set of entries based at least in part on the determining, each entry of the set of entries indicating a mapping between a logical address of the set of logical addresses and a physical address of a set of physical addresses, the set of entries associated with a first level of a mapping information; and store an entry in a second level of the mapping information based at least in part on the generating, the entry indicating the mapping between the set of logical addresses and the set of physical addresses based at least in part on the subset of logical addresses being sequential.

Aspect 11: The apparatus of aspect 10, where the controller is further configured to cause the apparatus to: receive a second command associated with second data having a corresponding second set of logical addresses; determine whether the set of logical addresses includes the second set of logical addresses; and perform, based at least in part on the set of logical addresses including the second set of logical addresses, an access operation associated with the second command in accordance with the mapping indicated by the entry in the second level of the mapping information.

Aspect 12: The apparatus of any of aspects 10 through 11, where the controller is further configured to cause the apparatus to: determine whether a second subset of logical addresses of the set of logical addresses is sequential; generate a second set of entries associated with the first level of the mapping information based at least in part on the determining, each entry of the second set of entries indicating a second mapping between a logical address of the second subset of logical addresses and a physical address of a second set of physical addresses; and update the entry in the second level of the mapping information based at least in part on the generating, the updated entry including an exception pointer indicating the second mapping between the subset of logical addresses and the second set of physical addresses based at least in part on the second subset of logical addresses not being sequential.

Aspect 13: The apparatus of aspect 12, where the controller is further configured to cause the apparatus to: determine whether a quantity of exception pointers in the updated entry satisfies a threshold; and discard the updated entry in the second level of the mapping information based at least in part on the quantity of exception pointers satisfying the threshold.

Aspect 14: The apparatus of aspect 13, where the controller is further configured to cause the apparatus to: store a second entry in a third level of the mapping information based at least in part on discarding the updated entry in the second level of the mapping information, the second entry including the quantity of exception pointers.

Aspect 15: The apparatus of any of aspects 10 through 14, where the entry in the second level of the mapping information includes a bit field indicating a compression parameter that is associated with the set of entries in the first level of the mapping information and the entry in the second level of the mapping information.

Aspect 16: The apparatus of any of aspects 10 through 15, where the controller is further configured to cause the apparatus to: store a second entry in a third level of the mapping information based at least in part on storing the entry in the second level, the second entry indicating a location of the stored entry; and store a third entry in a fourth level of the mapping information based at least in part on storing the second entry.

Aspect 17: The apparatus of aspect 16, where: the first level of the mapping information includes a logical to physical map; the second level of the mapping information includes a macro map; the third level of the mapping information includes a global map; and the fourth level of the mapping information includes a root map.

Aspect 18: The apparatus of any of aspects 10 through 17, where the mapping information includes a logical to physical mapping table.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
receive a command associated with data having a corresponding set of logical addresses;
determine whether a subset of logical addresses of the set of logical addresses is sequential;
generate a set of entries based at least in part on the determining, each entry of the set of entries indicating a mapping between a logical address of the set of logical addresses and a physical address of a set of physical addresses, the set of entries associated with a first level of a mapping information; and
store a coalesced entry comprising the subset of logical addresses in a second level of the mapping information based at least in part on the generating, the entry indicating the mapping between the set of logical addresses and the set of physical addresses based at least in part on the subset of logical addresses being sequential.

2. The memory system of claim 1, wherein the processing circuitry is further configured to cause the memory system to:
receive a second command associated with second data having a corresponding second set of logical addresses;
determine whether the set of logical addresses comprises the second set of logical addresses; and
perform, based at least in part on the set of logical addresses comprising the second set of logical addresses, an access operation associated with the second command in accordance with the mapping indicated by the entry in the second level of the mapping information.

3. The memory system of claim 1, wherein the processing circuitry is further configured to cause the memory system to:
determine whether a second subset of logical addresses of the set of logical addresses is sequential;
generate a second set of entries associated with the first level of the mapping information based at least in part on the determining, each entry of the second set of entries indicating a second mapping between a logical address of the second subset of logical addresses and a physical address of a second set of physical addresses; and
update the entry in the second level of the mapping information based at least in part on the generating, the updated entry comprising an exception pointer indicating the second mapping between the subset of logical addresses and the second set of physical addresses based at least in part on the second subset of logical addresses not being sequential.

4. A memory system, comprising:
one or more memory devices; and
processing circuitry coupled with the one or more memory devices and configured to cause the memory system to:
receive a command associated with data having a corresponding set of logical addresses;
determine whether a subset of logical addresses of the set of logical addresses is sequential;
generate a set of entries based at least in part on the determining, each entry of the set of entries indicating a mapping between a logical address of the set of logical addresses and a physical address of a set of physical addresses, the set of entries associated with a first level of a mapping information;
store an entry in a second level of the mapping information based at least in part on the generating, the entry indicating the mapping between the set of logical addresses and the set of physical addresses based at least in part on the subset of logical addresses being sequential;
determine whether a second subset of logical addresses is sequential;
generate a second set of entries associated with the first level of the mapping information based at least in part on the determining, each entry of the second set of entries indicating a second mapping between a logical address of the second subset of logical addresses and a physical address of a second set of physical addresses;
update the entry in the second level of the mapping information based at least in part on the generating, the updated entry comprising an exception pointer indicating the second mapping between the subset of logical addresses and the second set of physical addresses based at least in part on the second subset of logical addresses not being sequential;
determine whether a quantity of exception pointers in the updated entry satisfies a threshold; and
discard the updated entry in the second level of the mapping information based at least in part on the quantity of exception pointers satisfying the threshold.

5. The memory system of claim 4, wherein the processing circuitry is further configured to cause the memory system to:
store a second entry in a third level of the mapping information based at least in part on discarding the updated entry in the second level of the mapping information, the second entry comprising the quantity of exception pointers.

6. The memory system of claim 1, wherein the entry in the second level of the mapping information comprises a bit field indicating a compression parameter that is associated with the set of entries in the first level of the mapping information and the entry in the second level of the mapping information.

7. The memory system of claim 1, wherein the processing circuitry is further configured to cause the memory system to:
store a second entry in a third level of the mapping information based at least in part on storing the entry in the second level, the second entry indicating a location of the stored entry; and
store a third entry in a fourth level of the mapping information based at least in part on storing the second entry.

8. The memory system of claim 7, wherein:
the first level of the mapping information comprises a logical to physical map;
the second level of the mapping information comprises a macro map;
the third level of the mapping information comprises a global map; and
the fourth level of the mapping information comprises a root map.

9. The memory system of claim 1, wherein the mapping information comprises a logical to physical mapping table.

10. A non-transitory computer-readable medium storing code, the code comprising instructions executable by one or more processors to:
receive, at a memory system, a command associated with data having a corresponding set of logical addresses;
determine whether a subset of logical addresses of the set of logical addresses is sequential;
generate a set of entries based at least in part on the determining, each entry of the set of entries indicating a mapping between a logical address of the set of logical addresses and a physical address of a set of physical addresses, the set of entries associated with a first level of a mapping information; and
store a coalesced entry comprising the subset of logical addresses in a second level of the mapping information based at least in part on the generating, the entry indicating the mapping between the set of logical addresses and the set of physical addresses based at least in part on the subset of logical addresses being sequential.

11. The non-transitory computer-readable medium of claim 10, wherein the instructions are further executable by the one or more processors to:
  receive a second command associated with second data having a corresponding second set of logical addresses;
  determine whether the set of logical addresses comprises the second set of logical addresses; and
  perform, based at least in part on the set of logical addresses comprising the second set of logical addresses, an access operation associated with the second command in accordance with the mapping indicated by the entry in the second level of the mapping information.

12. The non-transitory computer-readable medium of claim 10, wherein the instructions are further executable by the one or more processors to:
  determine whether a second subset of logical addresses of the set of logical addresses is sequential;
  generate a second set of entries associated with the first level of the mapping information based at least in part on the determining, each entry of the second set of entries indicating a second mapping between a logical address of the second subset of logical addresses and a physical address of a second set of physical addresses; and
  update the entry in the second level of the mapping information based at least in part on the generating, the updated entry comprising an exception pointer indicating the second mapping between the subset of logical addresses and the second set of physical addresses based at least in part on the second subset of logical addresses not being sequential.

13. A non-transitory computer-readable medium storing code, the code comprising instructions executable by one or more processors to:
  receive, at a memory system, a command associated with data having a corresponding set of logical addresses;
  determine whether a subset of logical addresses of the set of logical addresses is sequential;
  generate a set of entries based at least in part on the determining, each entry of the set of entries indicating a mapping between a logical address of the set of logical addresses and a physical address of a set of physical addresses, the set of entries associated with a first level of a mapping information;
  store an entry in a second level of the mapping information based at least in part on the generating, the entry indicating the mapping between the set of logical addresses and the set of physical addresses based at least in part on the subset of logical addresses being sequential;
  determine whether a second subset of logical addresses of the set of logical addresses is sequential;
  generate a second set of entries associated with the first level of the mapping information based at least in part on the determining, each entry of the second set of entries indicating a second mapping between a logical address of the second subset of logical addresses and a physical address of a second set of physical addresses;
  update the entry in the second level of the mapping information based at least in part on the generating, the updated entry comprising an exception pointer indicating the second mapping between the subset of logical addresses and the second set of physical addresses based at least in part on the second subset of logical addresses not being sequential;
  determine whether a quantity of exception pointers in the updated entry satisfies a threshold; and
  discard the updated entry in the second level of the mapping information based at least in part on the quantity of exception pointers satisfying the threshold.

14. The non-transitory computer-readable medium of claim 13, wherein the instructions are further executable by the one or more processors to:
  store a second entry in a third level of the mapping information based at least in part on discarding the updated entry in the second level of the mapping information, the second entry comprising the quantity of exception pointers.

15. The non-transitory computer-readable medium of claim 10, wherein the entry in the second level of the mapping information comprises a bit field indicating a compression parameter that is associated with the set of entries in the first level of the mapping information and the entry in the second level of the mapping information.

16. The non-transitory computer-readable medium of claim 10, wherein the instructions are further executable by the one or more processors to:
  store a second entry in a third level of the mapping information based at least in part on storing the entry in the second level, the second entry indicating a location of the stored entry; and
  store a third entry in a fourth level of the mapping information based at least in part on storing the second entry.

17. The non-transitory computer-readable medium of claim 16, wherein:
  the first level of the mapping information comprises a logical to physical map;
  the second level of the mapping information comprises a macro map;
  the third level of the mapping information comprises a global map; and
  the fourth level of the mapping information comprises a root map.

18. The non-transitory computer-readable medium of claim 10, wherein the mapping information comprises a logical to physical mapping table.

19. A method, comprising:
  receiving, at a memory system, a command associated with data having a corresponding set of logical addresses;
  determining whether a subset of logical addresses of the set of logical addresses is sequential;
  generating a set of entries based at least in part on the determining, each entry of the set of entries indicating a mapping between a logical address of the set of logical addresses and a physical address of a set of physical addresses, the set of entries associated with a first level of a mapping information; and
  storing a coalesced entry comprising the subset of logical addresses in a second level of the mapping information based at least in part on the generating, the entry indicating the mapping between the set of logical addresses and the set of physical addresses based at least in part on the subset of logical addresses being sequential.

20. The method of claim 19, further comprising:
  receiving a second command associated with second data having a corresponding second set of logical addresses;
  determining whether the set of logical addresses comprises the second set of logical addresses; and performing, based at least in part on the set of logical addresses comprising the second set of logical addresses, an access operation associated with the second command in accordance with the mapping indicated by the entry in the second level of the mapping information.

21. The method of claim 19, further comprising:

determining whether a second subset of logical addresses of the set of logical addresses is sequential;

generating a second set of entries associated with the first level of the mapping information based at least in part on the determining, each entry of the second set of entries indicating a second mapping between a logical address of the second subset of logical addresses and a physical address of a second set of physical addresses; and updating the entry in the second level of the mapping information based at least in part on the generating, the updated entry comprising an exception pointer indicating the second mapping between the subset of logical addresses and the second set of physical addresses based at least in part on the second subset of logical addresses not being sequential.

22. A method, comprising:

receiving, at a memory system, a command associated with data having a corresponding set of logical addresses;

determining whether a subset of logical addresses of the set of logical addresses is sequential;

generating a set of entries based at least in part on the determining, each entry of the set of entries indicating a mapping between a logical address of the set of logical addresses and a physical address of a set of physical addresses, the set of entries associated with a first level of a mapping information;

storing an entry in a second level of the mapping information based at least in part on the generating, the entry indicating the mapping between the set of logical addresses and the set of physical addresses based at least in part on the subset of logical addresses being sequential;

determining whether a second subset of logical addresses of the set of logical addresses is sequential;

generating a second set of entries associated with the first level of the mapping information based at least in part on the determining, each entry of the second set of entries indicating a second mapping between a logical address of the second subset of logical addresses and a physical address of a second set of physical addresses;

updating the entry in the second level of the mapping information based at least in part on the generating, the updated entry comprising an exception pointer indicating the second mapping between the subset of logical addresses and the second set of physical addresses based at least in part on the second subset of logical addresses not being sequential;

determining whether a quantity of exception pointers in the updated entry satisfies a threshold; and discarding the updated entry in the second level of the mapping information based at least in part on the quantity of exception pointers satisfying the threshold.

23. The method of claim 22, further comprising:

storing a second entry in a third level of the mapping information based at least in part on discarding the updated entry in the second level of the mapping information, the second entry comprising the quantity of exception pointers.

24. The method of claim 19, wherein the entry in the second level of the mapping information comprises a bit field indicating a compression parameter that is associated with the set of entries in the first level of the mapping information and the entry in the second level of the mapping information.

25. The method of claim 19, further comprising:

storing a second entry in a third level of the mapping information based at least in part on storing the entry in the second level, the second entry indicating a location of the stored entry; and storing a third entry in a fourth level of the mapping information based at least in part on storing the second entry.

* * * * *